UNITED STATES PATENT OFFICE.

MARK W. MARSDEN, OF PHILADELPHIA, PENNSYLVANIA, ASSIGNOR TO SUGAR CANE BY-PRODUCTS CO., OF PHILADELPHIA, PENNSYLVANIA, A CORPORATION OF DELAWARE.

PACKING OR OBTURATING MATERIAL.

1,170,488.        Specification of Letters Patent.        Patented Feb. 1, 1916.

No Drawing.        Application filed March 17, 1914. Serial No. 825,373.

*To all whom it may concern:*

Be it known that I, MARK WORSNOP MARSDEN, a citizen of the United States, and a resident of Philadelphia, in the county of Philadelphia and State of Pennsylvania, have invented a new and useful Packing or Obturating Material, of which the following is a specification.

The object of my invention is to provide an inexpensive and thoroughly reliable packing or filling material, which is non-conducting and non-inflammable, and useful for packing and insulating the walls of refrigerators, refrigerator cars and cold storage plants, or as a padding for carpet linings, or to protect the interior of vessels against damage from water caused by the rupture of projectiles or collisions.

After many experiments and tests with different raw materials I have discovered that bagasse or sugar cane after the expression of the sugar juices, when treated in accordance with my present invention, renders a material which is cheap and otherwise advantageous and adapted to function as hereinbefore mentioned.

In practising the invention the bagasse is subjected to the action of heat to evaporate or otherwise dispel the moisture content and to loosen the pith or cellular tissue from the outer shell or bark. I find that the center of the cane is practically devoid of fiber and is composed of pith in a state of almost pure cellulose. The separation of this from the fiber-containing shell or bark is facilitated by comminuting the stock either prior to or during its presence in the drier. The pith or cellulose being much lighter than the shell or fibrous portion may readily be separated therefrom by screening and blowing in any suitable or well-known manner. The product is then treated in any suitable manner to eliminate the extractive, which may, if desired, be recovered in useful form so as to make the method self-sustaining.

If desired the product may be bleached by resorting to any of the usual bleaching processes. It is then dried and may be used either in its loose or flocculent state or it may be pressed or molded into the desired shape; and if desired any suitable bonding material may be added to facilitate the pressing and molding.

In order to apply the product to the purposes I have mentioned I prefer to chemically treat it so as to render it non-inflammable. This may be accomplished, for example, by saturating the product either in its loose state, or after sheeting, blocking, or otherwise shaping it, with solutions of sal ammoniac, sulfate of zinc, sulfate of magnesia in combination with or without silicate of soda. Some of these produce good results alone or in combination with others.

It is evident from the foregoing that by my method of treatment I recover and make capable of manifold industrial uses a material that was heretofore wasted.

Having described the nature and object of the invention what I claim as new and desire to secure by Letters Patent is:

The herein-described durable and non-rotting packing or obturating material consisting of bagasse primarily deprived of its residual sugar and other fermentable bodies and separated from its fiber bearing shell or bark and combined with a chemical designed to render it non-inflammable.

In testimony whereof I have hereunto signed my name in the presence of two subscribing witnesses.

MARK W. MARSDEN.

Witnesses:
E. W. STRAIN,
FRANK SALASIN.